United States Patent [19]
Che

[11] Patent Number: 5,633,770
[45] Date of Patent: May 27, 1997

[54] DIGITAL OUTPUT MAGNETORESISTIVE (DOMR) HEAD AND METHODS ASSOCIATED THEREWITH

[75] Inventor: Xiaodong Che, Sunnyvale, Calif.

[73] Assignee: Quantum Corporation, Milpitas, Calif.

[21] Appl. No.: 688,127

[22] Filed: Jul. 27, 1996

Related U.S. Application Data

[62] Division of Ser. No. 239,243, May 6, 1994, Pat. No. 5,546,253.

[51] Int. Cl.⁶ .............................. G11B 5/39; G01R 33/02
[52] U.S. Cl. .......................... 360/113; 360/41; 324/252; 338/32 R
[58] Field of Search ........................... 360/41, 125, 126, 360/113; 324/252; 338/32 R

[56] References Cited

U.S. PATENT DOCUMENTS

| | | | |
|---|---|---|---|
| 5,159,513 | 10/1992 | Dieny et al. | 360/113 |
| 5,206,590 | 4/1993 | Dieny et al. | 324/252 |
| 5,285,339 | 2/1994 | Chen et al. | 360/113 |
| 5,287,238 | 2/1994 | Baumgart et al. | 360/113 |
| 5,301,079 | 4/1994 | Cain et al. | 360/113 |
| 5,315,468 | 5/1994 | Lin et al. | 360/113 |
| 5,341,261 | 8/1994 | Dieny et al. | 360/113 |
| 5,343,422 | 8/1994 | Kung et al. | 360/113 |
| 5,373,238 | 12/1994 | McGuire et al. | 324/252 |
| 5,422,571 | 6/1995 | Gurney et al. | 324/252 |

*Primary Examiner*—Jefferson Evans
*Attorney, Agent, or Firm*—David B. Harrison

[57] ABSTRACT

A digital output magnetoresistive ("DOMR") head for magnetic playback comprising one or more "pinned" magnetic layers having magnetic polar direction which does not rotate under an external field from the media, and a magnetic digital switching layer formed using either shape or crystalline anisotropy such that it has an easy axis parallel to the magnetic direction of the pinned layer or layers and two stable magnetization directions, parallel or antiparallel to the magnetization polar direction of the pinned layer or layers. Because of this dual stable state configuration the DOMR head produces a substantially digital output when reading magnetic information.

8 Claims, 8 Drawing Sheets

DIGITAL OUTPUT MAGNETORESISTIVE (DOMR) HEAD AND METHODS ASSOCIATED THEREWITH

REFERENCE TO RELATED APPLICATION

This application is a division of application Ser. No. 08/239,243, filed May 6, 1994, now U.S. Pat. No. 5,546,253.

FIELD OF THE INVENTION

The field of the invention pertains to magnetic recording, more particularly to a dual stable state (digital output) magnetoresistive head for reading back magnetic information, and methods re same.

BACKGROUND OF THE INVENTION

In the past, magnetoresistive ("MR") heads and sensors have been used for reading magnetic information stored on both magnetic disk and tape storage systems. Magnetoresistive heads are capable of producing high signal output with low noise that is independent of media velocity if the flying height is a constant. This high signal output and low noise, i.e., high signal to noise ratio, makes possible media noise limited overall system performance at high areal storage densities.

Magnetoresistive heads detect magnetic transitions through the resistance change of an MR read element which varies as a function of the strength and direction of the magnetic flux impinging on the read element. By applying an electrical sense current to the MR head structure an output voltage may be generated which is proportional to the resistance of the material, and in turn proportional to the magnetic field from the media.

A known first class of MR heads typically utilize a single-domain thin film (on the order of 500 angstrom units in thickness) permalloy sensor element with a small internal crystalline anisotropy axis, or "easy axis," typically induced during film deposition by the application of a static magnetic field. These MR heads function according to the anisotropic magnetoresistive ("AMR") effect, where the resistance of the MR sensor element varies as a function of square of the cosine ($cos^2$) of the angle between the magnetization direction of the sensor element and the sense current direction.

Biasing techniques are typically employed with AMR heads so that the MR sensor element operates in the linear region of its transfer curve and avoids the quadratic response of the $cos^2$ function. Biasing is often achieved by the addition of a second permalloy layer or soft adjacent layer ("SAL") separated by a spacer from the MR sensor element. A more detailed description of MR heads that operate according to the AMR effect is found in "Magnetoresistive Head Technology", D. Markham et al., Proc. of the Elect. Chem. Soc. Vol. 90–8, p. 185 (1990), which is incorporated herein by reference.

Recently, a second class of MR heads, commonly referred to as spin valves, have been developed that have a more pronounced MR effect. Spin valve MR heads are multilayered structures that typically have two or more magnetic layers separated by a non-magnetic layer. As discussed in U.S. Pat. No. 5,287,238 to Baumgart et at., the physical phenomena associated with the change in resistance of such layered magnetic structures is variously referred to as the giant magnetoresistive ("GMR") effect or the "spin valve" effect. This effect has been attributed to the spin-dependent transmission of the conduction electrons between magnetic layers through a non-magnetic layer and the accompanying spin-dependent scattering at the layer interfaces.

Unlike conventional AMR heads, the resistance of a spin valve MR head does not change as a function of applied sense current direction. Rather, as described in "Giant Magnetoresistance in Soft Ferromagnetic Multilayers", Dieny et al., American Physical Society Vol. 43, No. 1 p. 1297 (1991), which is incorporated herein by reference in its entirety, the in-plane resistance between a pair of ferromagnetic layers separated by a non-magnetic layer varies as a function of the cosine of the angle between the magnetization in the two layers.

In spin valve MR heads one or more of the magnetic layers is typically "pinned" through the use of exchange coupling, as is well known in the art, such that their magnetization direction is fixed while the MR sensor element layer is free to rotate under the influence of the fringing fields from the magnetic transitions stored on the media. The fringing fields from the media causes the magnetization direction of the sensor element to rotate relative to the fixed magnetization direction of the pinned magnetic layer or layers. As is the case with conventional AMR heads, spin valve MR heads having an easy axis perpendicular to the magnetic direction of the field to be sensed are known.

U.S. Pat. No. 5,159,513 to Dieny et at., and U.S. Pat. No. 5,206,590 also to Dieny et at., describe a spin valve MR head consisting of a multilayered structure formed on a substrate. Both the aforementioned patents describe a spin valve MR head having a first and second thin film layer of magnetic material separated by a thin film layer of non-magnetic material. The magnetization direction of the first ferromagnetic layer in the absence of an applied magnetic field must be substantially perpendicular to the magnetization direction of the second ferromagnetic layer which is fixed in position.

U.S. Pat. No. 5,287,238 to Baumgart et at., describes a variation on the structure of the spin valve MR head disclosed in the Dieny patents. Baumgart et al. discloses a dual spin valve MR head having first, second and third ferromagnetic layers separated from each other by nonmagnetic layers. The outer ferromagnetic layers in the structure have their magnetic orientation fixed while the middle layer is comprised of soft ferromagnetic material which is free to rotate in magnetic direction in cooperation with the field from the media. As in the Dieny patents, for the described spin valve MR head to work, the magnetic direction of the middle rotating sensor element layer in Baumgart et al. is oriented perpendicular to the magnetization direction of the fixed outer layers when the applied field is zero.

In these known spin valve MR heads which have only one stable magnetization state, an analog output signal is detected by applying a small sense current to the head structure. The voltage output is an analog signal in that it continuously varies as a function of the MR head's resistance. The maximum change in magnetic orientation of the sensor element layer is limited to 90 degrees from its easy axis and typically must be constrained to even more limited rotation to provide for operation in the linear range of the MR material's transfer curve. Therefore, as such a known spin valve MR head passes over a magnetic transition on the recording media the magnetization direction of the sensor element is rotated a maximum of 90 degrees in a time varying manner, causing a change in resistance in the material and a resultant analog voltage output waveform.

In order to recover the actual recorded user data this analog output signal is typically converted into a digital signal during the demodulation process, which typically involves relatively complex peak detection circuitry. In recording channels using partial response maximum likelihood ("PRML") detection, a Viterbi algorithm is utilized that is even more complex than traditional peak detection. Additionally, since in digital recording systems the user data to be stored on the magnetic media is typically written in non-return to zero ("NRZ") format, the NRZI data output of spin valve MR heads must then be converted back to NRZ format to recover the user data.

Accordingly, it would be desirable to provide an MR head capable of producing a digital output in order to simplify magnetic flux transition detection schemes. Also, it would be desirable to eliminate the need for transformation of the recovered data from NRZI to NRZ format.

SUMMARY OF THE INVENTION

A general object of the present invention is to provide a digital output magnetoresistive head which overcomes limitations and drawbacks of the prior structures, approaches and methods.

A more specific object of the present invention is to provide a bistable magnetoresistive data transducer head which operates in a saturation region of the MR material's transfer curve, so as to produce a higher voltage output than conventional MR heads in response to the presence of a proximate magnetic field.

Another object of the present invention is to provide a bistable magnetoresistive data transducer head manifesting magnetic hysteresis so as to provide a non-return-to-zero output upon encountering a serial sequence of recorded magnetic flux regions of alternating magnetic polarity.

In accordance with principles of the invention a multi-layered digital output magnetoresistive ("DOMR") head provides a substantially digital output for playback in magnetic data storage devices, whether disk or tape. The preferred device comprises one or more "pinned" magnetic layers. The magnetic direction or orientation of these pinned layers does not substantially rotate under the influence of an external field from the media. A digital magnetic switching layer is separated from the pinned layer or layers by one or more layers of nonmagnetic material. The magnetization direction of the pinned layer or layers is fixed substantially parallel, or antiparallel to the magnetization direction of the digital switching layer. Antiparallel, as used herein, is defined as having magnetization directions 180 degrees apart. The digital magnetic switching layer is formed using either shape or crystalline anisotropy such that it has an easy axis substantially parallel to the magnetic direction of the pinned layer or layers. The DOMR head has two stable states for the magnetization direction in the switching layer; parallel or antiparallel (i.e., in opposite directions), to the magnetization direction of the pinned layer(s), providing a substantially two state or digital output according to the polarity of the magnetic field domains of the media.

The inventive method for reading alternating magnetic domains from a relatively moving magnetic storage media using a digital output head also solves many of the problems encountered by methods employing analog output heads. Since the DOMR head operates in the saturation (nonlinear) region of the MR material's transfer curve, it is capable of producing a higher voltage output than conventional analog output MR heads which are typically constrained to operate in their linear region. Also, the hi-stable operation of the preferred device produces a substantially two level (digital) output that simplifies recording channel detection schemes. An added benefit is that the output of the preferred device is in NRZ format, the same format typically used to record the data, rather than the NRZI output produced by a conventional analog read head. Since the output of the preferred device is in the same format as the recorded data it is not necessary to convert the output from NRZI to NRZ as is the case with a conventional analog output read head, thus resulting in simplification of recording channel circuitry.

In another aspect of the present invention, a method is provided for detecting information stored upon a magnetic storage disk or tape as sequential magnetic transitions. The method comprises the steps of:

(a) moving the magnetic recording disk or tape relative to a DOMR head at a predetermined relative velocity;

(b) loading a head arm assembly including the DOMR head into proximity with the disk or tape such that the head is supported in close proximity to the recording surface;

(c) positioning the head over said magnetic transitions to be read;

(d) passing a sensing current through the head to generate a voltage across it as a function of its electrical resistance, the resistance manifesting a first value after the head has passed over a first magnetic transition comprising magnetic flux, the resistance manifesting a second value after the head has passed over a second magnetic transition comprising magnetic flux and wherein the second transition magnetic flux is opposite in polarity from that of the first transition; and (e) putting out a signal proportional to the resistance to a read channel comprising signal detection circuitry.

As a related aspect of the present invention, the method comprises the further step of detecting the information from the signal with the signal detection circuitry without taking a derivative thereof.

In a further aspect of the present invention a method is provided for making a magnetoresistive head in accordance with principles of the present invention. The method comprises the steps of:

(a) depositing a first layer of magnetic material on a substrate, the first layer of magnetic material comprising an easy axis oriented substantially perpendicular to a plane of a magnetic recording surface over which the head is to be positioned;

(b) depositing a layer of nonmagnetic material over the first layer of magnetic material;

(c) depositing a second layer of magnetic material over the layer of nonmagnetic material; and, (d) depositing an antiferromagnetic pinning layer over the second layer such that the second layer of magnetic material has a magnetization direction fixed substantially parallel to the easy axis by exchange coupling from the antiferromagnetic pinning layer.

In this aspect of the present invention, the layer of nonmagnetic material preferably comprises a material selected from the group consisting of copper, silver, gold and alloys containing copper, silver or gold; the first layer of magnetic material comprises cobalt or a cobalt alloy and has an easy magnetic axis formed using crystalline anisotropy; and, the second layer of magnetic material comprises NiFe.

Further, in this aspect of the present invention the step of depositing the first layer of magnetic material comprises the step of forming the first layer in a rectangular shape having a length dimension (e.g. 2.1 µm) perpendicular to the plane of the magnetic recording surface over which the head is positioned which is approximately twice a width dimension (e.g. 1 µm) across a recording track of the magnetic recording surface being followed by the head.

These and other objects, advantages, aspects and features of the present invention will be more fully understood and appreciated upon consideration of the following detailed description of a preferred embodiment, presented in conjunction with the accompanying drawings.

DETAILED DESCRIPTION OF PREFERRED EMBODIMENTS

Figure 1A:
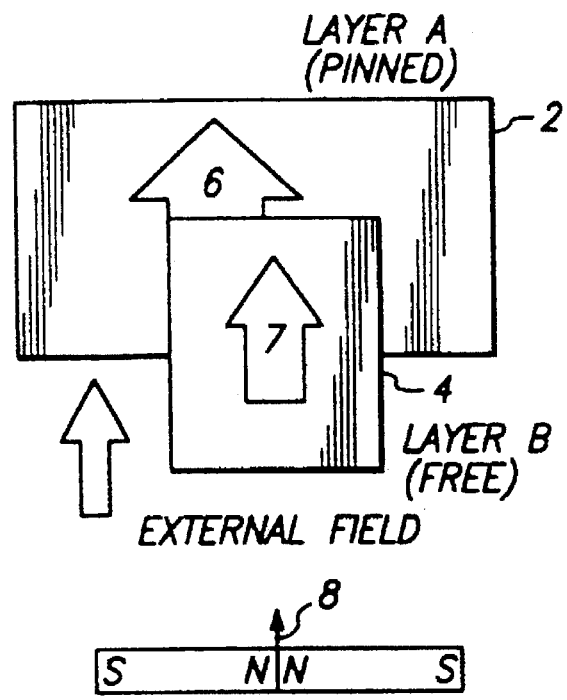
FIG. 1A shows one stable state of the hi-stable switching operation of the DOMR head according to the present invention; and, FIG 1B shows the other stable state thereof.
Figure 1B:
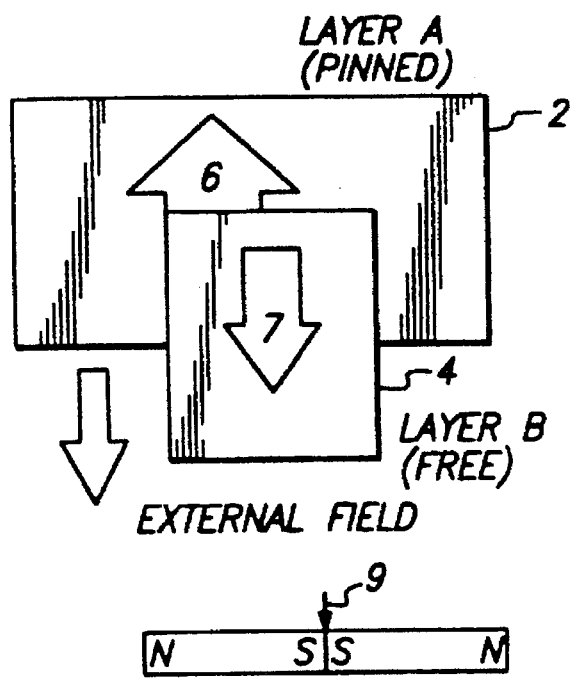

The operation of the bi-stable DOMR head according to the invention is shown in FIGS. 1A and 1B. The first magnetic layer 2 (layer A) has its magnetization direction "pinned" or fixed in the direction shown by arrow 6 such that it does not substantially rotate in magnetic direction under the influence of fringing external fields. If the total magnetic field from other parts of the head is relatively small, MR digital switching layer 4 (layer B), also a magnetic layer, may be formed using either shape or crystalline anisotropy, as is well known in the art, such that it has a vertical easy axis that is substantially parallel to the magnetization direction of pinned layer 2. It is of course understood that any reference herein to "vertical", "horizontal", "above", "below", "up", or "down" as well as to any other such directional terms is relative and is merely made to assist in describing-the relationship between various aspects of the preferred embodiments. Such terms in no way restrict the invention to those particular directions.

With this perpendicular anisotropy, and vertical easy axis, the magnetization direction of the MR digital switching layer 4 can only be in one of two stable states as shown by arrow 7; it can either point up (parallel to pinned layer 2, FIG. 1A) or down (antiparallel to pinned layer 2, FIG. 1B, where antiparallel is defined as having magnetization directions 180 degrees apart, or in opposite directions) in cooperation with the direction of the external field. Thus, as the DOMR head passes over a magnetic transition 8 in FIG. 1A the magnetic direction of MR digital switching layer 4, as shown by arrow 7 is parallel to the magnetic direction of pinned layer 2. When the DOMR head passes over the next magnetic transition 9 in FIG. 1B (having an opposite direction in terms of magnetic flux from preceding transition 8) the magnetic direction of MR digital switching layer 4 switches states to being antiparallel to that of pinned layer 2. The threshold level of the external field needed to switch the magnetization direction of MR digital switching layer 4 from one state to the other is determined by the digital switching layer's 4 shape or crystalline anisotropy. As would be obvious to those skilled in the art, the threshold will vary depending on the particular application.

Figure 2A:
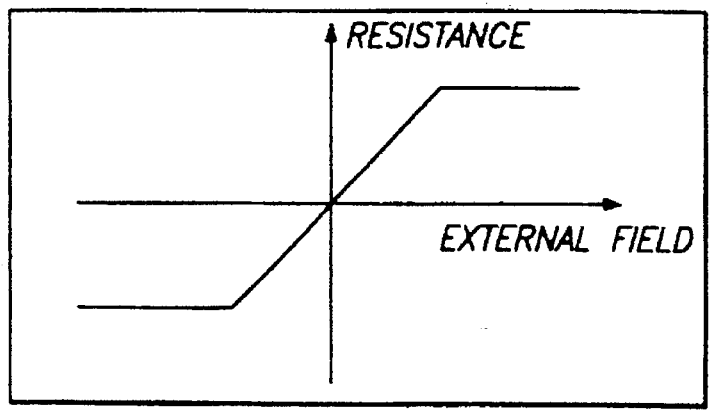
FIGS. 2a and 2b are related graphs which show the ideal transfer characteristics in terms of resistance vs. external magnetic field for a prior art spin valve MR head, and for the DOMR head according to the invention, respectively.
Figure 7:
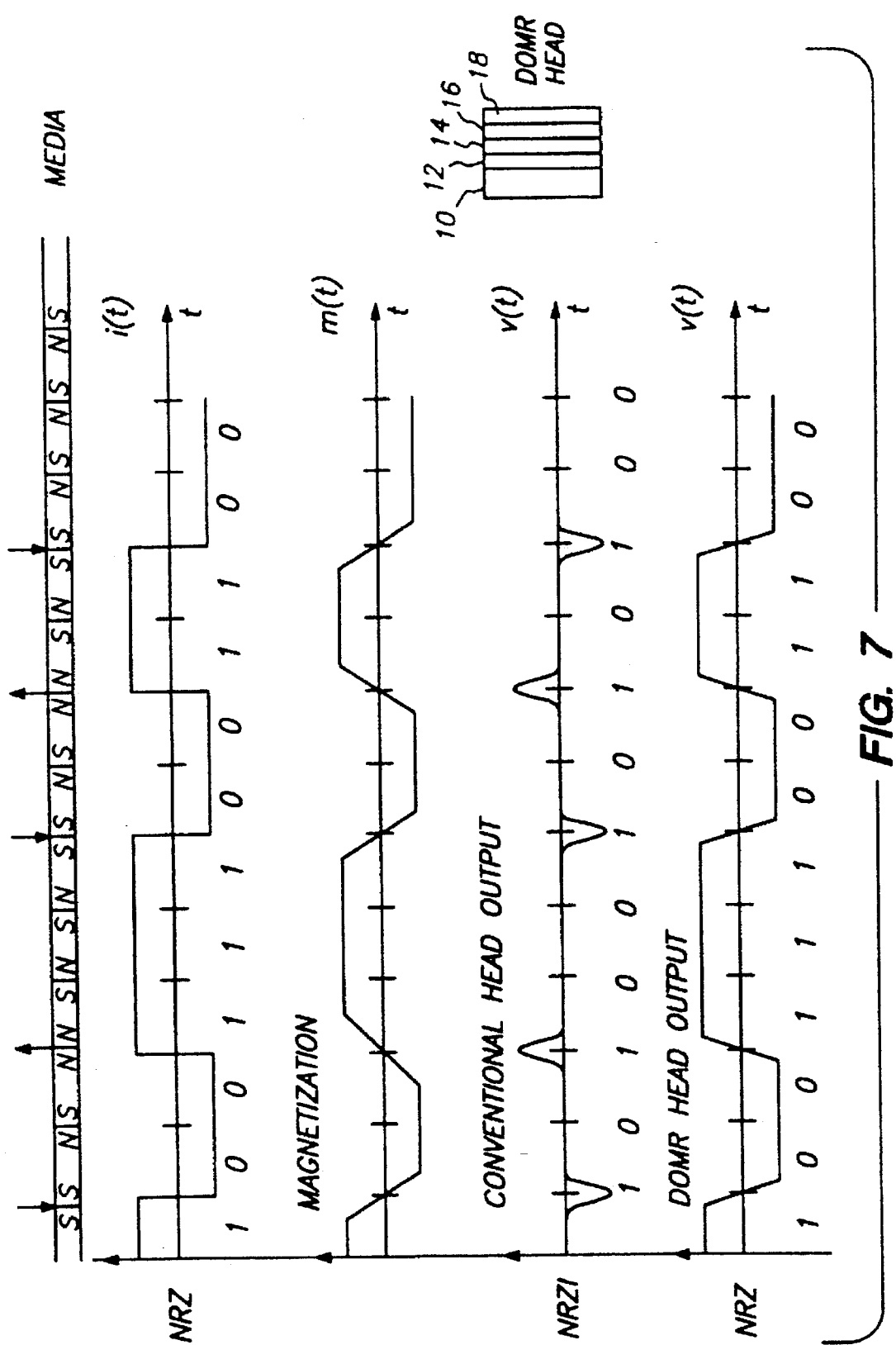
FIG. 7 shows a DOMR head according to the invention as it passes over a series of magnetically recorded transitions and a series of graphs showing respectively, the write current used to write the input data stream, the magnetization of the medium caused by the write current, the conventional head output voltage on readback, and the output of the DOMR head according to the present invention.

The graph in FIG. 2a shows idealized transfer characteristics for a conventional spin valve MR head with resistance plotted as a function of the external field. In FIG. 2a it can be seen that the output characteristics of the idealized conventional spin valve MR head are linear, and no hysteresis (or magnetic memory) is displayed. According to this transfer curve, as in the case of an inductive read head, the output of the conventional spin valve MR head is an analog waveform as is shown in FIG. 7.

Figure 2B:
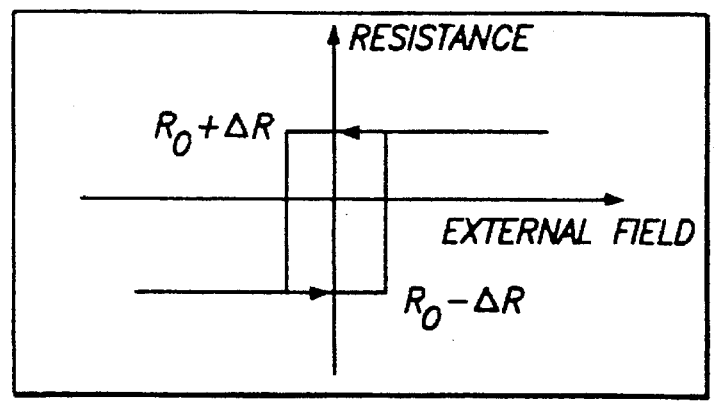

The transfer characteristics for an idealized DOMR head of the present invention are shown in FIG. 2b. Due to the dual stable state configuration, the DOMR head stays in one of the two states when the external proximate magnetic field is lower than the threshold. As the head passes over a recorded magnetic flux transition from one magnetic domain to the next one having a reversed field polarity, the external field from the transition causes the head to switch from one state to the other. As the media magnetic field reverses direction, as is the case when adjacently recorded magnetic transitions are to be read, the DOMR head switches its state coordinately. If a sensing current $I_s$ is applied, the voltage level of the high and low states can be written as:

$$V_{high}=I_s(R_0+\Delta R), V_{low}=I_s(R_0-\Delta R)$$

where $R_0$ is the resistance when the magnetization direction of the MR digital switching layer 4 is substantially perpendicular to that of the pinned layer 2, and $\Delta R$ is the resistance change when the magnetization direction of the MR digital switching layer 4 is parallel, or antiparallel, as the case may be, to that of pinned layer 2, providing a substantially digital output.

Figure 3A:
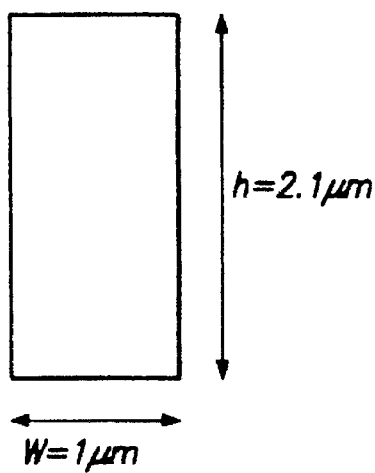
FIG. 3A shows a first one (Case 1) of two specific embodiments of the MR digital switching layer according to the invention.
Figure 3B:
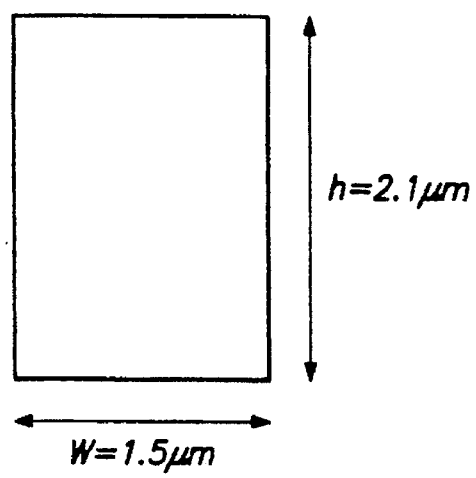
FIG. 3B shows the other one (Case 2) of the two embodiments.

In FIGS. 3A and 3B two presently preferred embodiments of the MR digital switching layer according to the invention are shown. It should be understood that while illustrative examples are now given of using shape anisotropy to create a vertical easy axis in the MR digital switching layer, that such an internal easy axis may also be created through the use of crystalline anisotropy, as is known in the art.

Figure 4A:
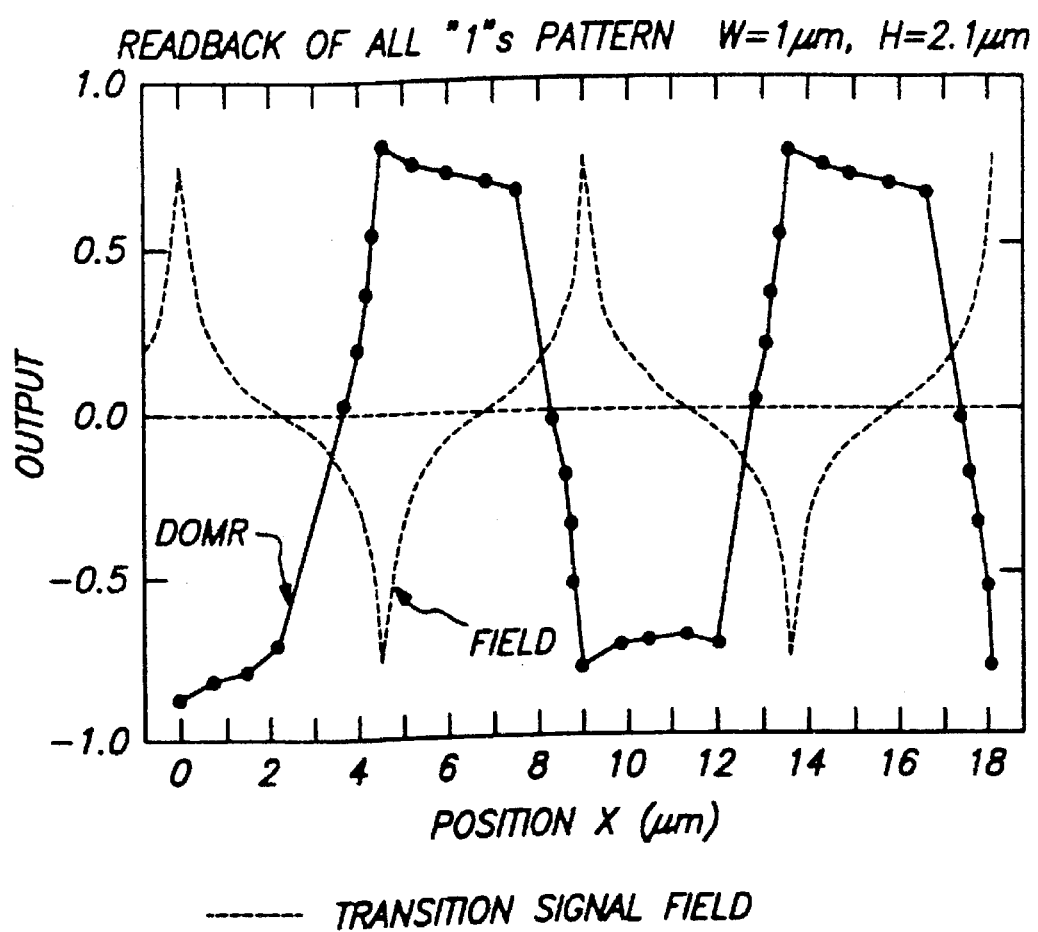
FIG. 4a is a graph of the output of a preferred DOMR head according to the invention as it passes over a series of magnetic transitions when the MR digital switching layer is shaped according to the shape anisotropy shown in case 1 of FIG. 3.

In the first embodiment (case 1 of FIG. 3A) the MR digital switching layer has a height of 2.1 µm and a width of 1 µm, for example. The results of using this particular shape anisotropy are shown in FIG. 4a for a readback of an all "1"s (high frequency) pattern of magnetic transitions. As shown in FIG. 4a, the normalized output of a DOMR head having a digital switching layer with the shape anisotropy shown in case 1 of FIG. 3A is a substantially digital waveform.

Figure 4B:
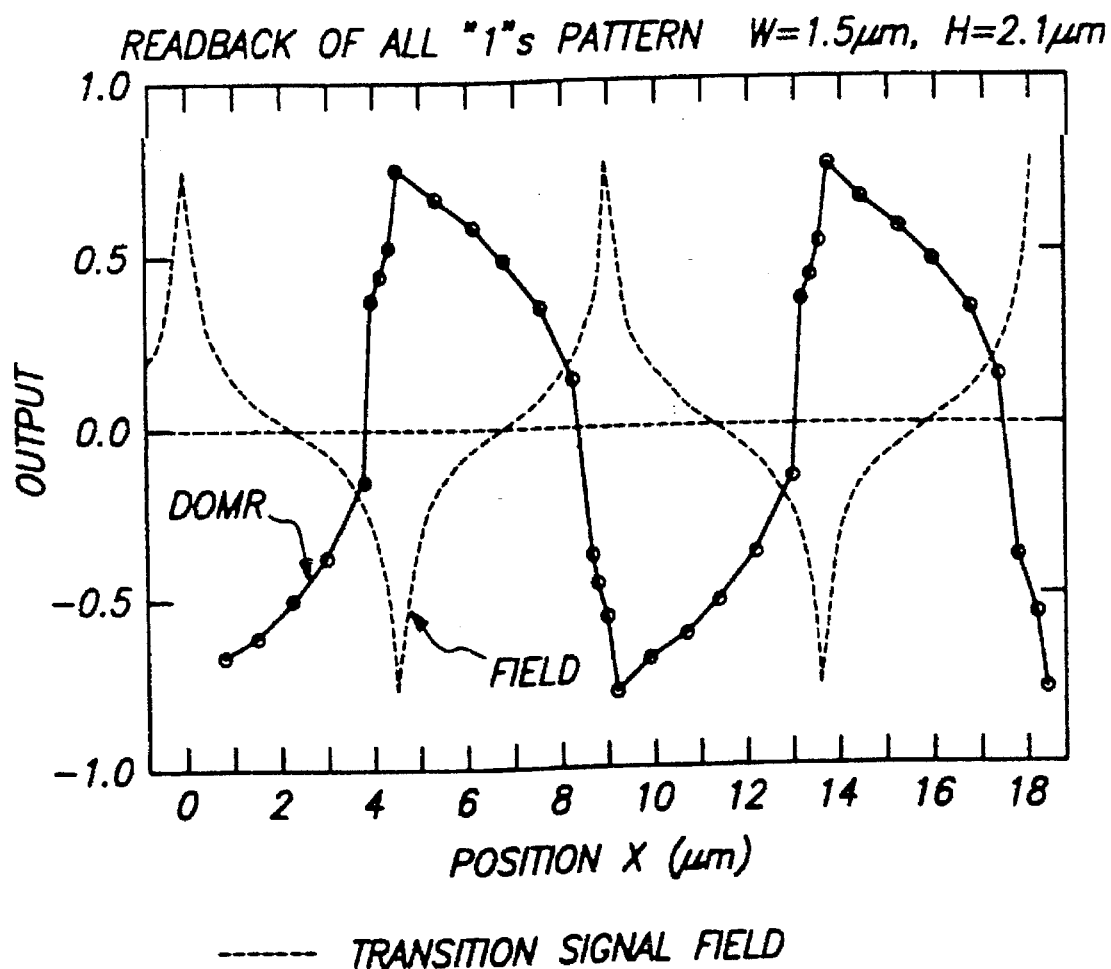
FIG. 4b is a graph of the output of a preferred DOMR head according to the invention as it passes over a series of magnetic transitions when the MR digital switching layer is shaped according to the shape anisotropy as shown in case 2 of FIG. 3.

Similarly, FIG. 4b shows the output for readback of a series of isolated magnetic transitions for a DOMR head having its digital switching layer shaped as shown in case 2 of FIG. 3B. As can be seen from a comparison of FIGS. 4a and 4b the shape anisotropy of case 1 in FIG. 3A provides a more well defined digital output waveform than that provided with case 2 of FIG. 3B.

The specific output characteristics of the DOMR head are a function of the particular shape or crystalline anisotropy chosen for the MR digital switching layer for the particular application. These factors are interrelated and can be adjusted in combination in achieving the desired bistable switching characteristics of the DOMR head. Other factors including media magnetic remanence, media film thickness, head-to-media distance and MR magnetic shield structure geometries are also considered in designing the DOMR head. From the examples provided herein, those of ordinary skill in the art will appreciate that a DOMR head with the desired substantially digital output may be produced using a wide variety of MR digital switching layer shape and/or crystalline anisotropies.

Figure 5:
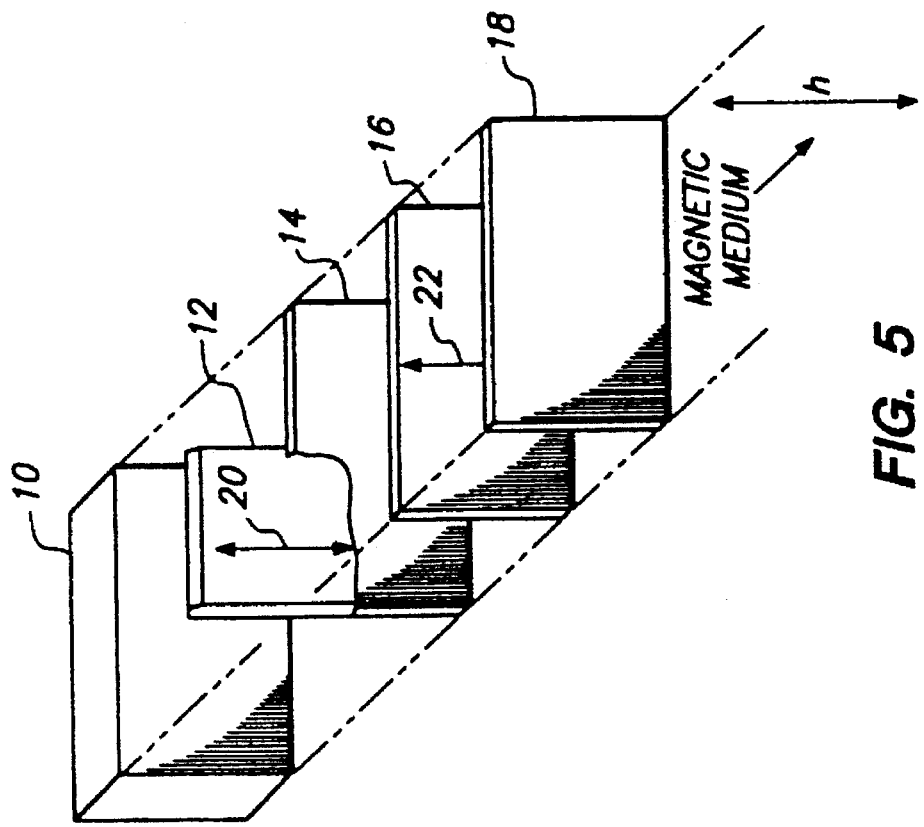
FIG. 5 is an exploded perspective view of an embodiment of a DOMR head according to the present invention.

The structure of a specific embodiment of the DOMR head according to the present invention is shown in FIG. 5 (and in FIG. 7). A presently preferred DOMR head is comprised of a series of layers typically deposited by thin film deposition on a suitable substrate 10 such as glass, ceramic, silicon or suitable material, for example. Deposited upon the substrate 10 is a first thin film layer of soft magnetic material 12, a thin film layer of nonmagnetic material 14, and a second thin film layer of magnetic material 16. The magnetization direction of the second layer of magnetic material 16 is pinned in position in the direction as shown by the arrow 22. The first layer of magnetic material 12, the digital switching layer, is formed by using either shape anisotropy (as represented in the figure) or crystalline anisotropy so that it has an easy axis (not shown) in the vertical direction parallel to the magnetization direction of pinned layer 16 (and perpendicular to the plane of a magnetic storage surface proximate thereto). As shown by arrow 20 the digital switching layer 12, comprises a magnetization direction having two stable states, parallel and antiparallel (in opposite directions) respectively, to the magnetization direction of pinned layer 16. Digital switching layer 12 is free to switch states from parallel to antiparallel and vice versa as the field from the media gradually switches direction, as when consecutively recorded magnetic domains of alternating magnetic polarity are read.

As is known in the art, and discussed in U.S. Pat. No. 5,159,513 to Dieny et al., second magnetic layer 16, the pinned layer, may be fixed in magnetic direction in several different ways. In the specific embodiment of the invention shown in FIG. 5, a thin film layer of an exchange biasing material 18 of a resistance at least several times higher than the material of the second magnetic layer is deposited in direct contact with the second magnetic layer 16 so that a biasing field can be produced by exchange coupling. The exchange biasing thin film layer is typically extremely thin, such as several atomic layers in thickness (e.g. 8–10 angstroms). Layer 18 can be an antiferromagnetic layer, such as FeMn, or, alternatively, a ferromagnetic layer of sufficiently high squareness, high coercivity and high resistance. The structure of FIG. 5 may also be inverted, so that layer 18 is deposited first, followed by layer 16, 14 and 12.

Alternatively, the magnetization of second magnetic layer 16 can be fixed in position by forming the layer from a magnetic material having a higher coercivity (i.e. manifesting permanent magnetism) than that of the first layer of magnetic material 12. Use of this permanently magnetized structure would eliminate the need for exchange biasing layer 18.

Figure 6:
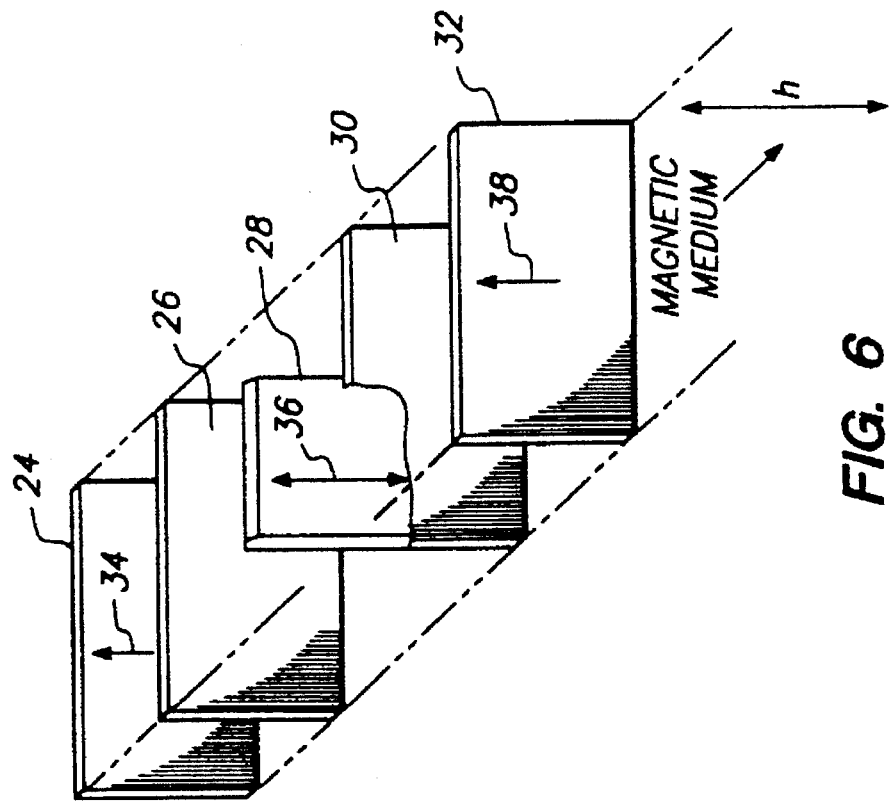
FIG. 6 is an exploded perspective view of another embodiment of a DOMR head according to the present invention.

The DOMR head is shown in another embodiment in FIG. 6. This embodiment differs from the embodiment shown in FIG. 5 in that it comprises first, second and third thin film layers of magnetic material, layers 24, 28 and 32, respectively, deposited on a suitable substrate (not shown) such as silicon, glass or ceramic, for example. Magnetic layers 24 and 32 have their magnetization directions fixed in position in the direction as shown by arrows 34 and 38, respectively, by one of the techniques discussed with reference to FIG. 5. Digital switching layer 28 is separated from pinned layer 24 by nonmagnetic layer 26, and from pinned layer 32 by nonmagnetic layer 30. Digital switching layer 28 has a two state magnetic direction, represented by dual headed arrow 36, that is either parallel or antiparallel to the magnetic direction of pinned layers 24 and 32 depending on the direction of the field from the media.

Specific materials that may comprise the various layers of a spin valve MR head are disclosed in U.S. Pat. No. 5,287,238 to Baumgart et al., U.S. Pat. No. 5,159,513 to Dieny et al., and U.S. Pat. No. 5,206,590 also to Dieny et al., which are hereby incorporated by reference in their entirety. Briefly, as with the layers described in Baumgart et al., at column 4, lines 51–59, the various layers that comprise the embodiments of the DOMR head disclosed with reference to FIGS. 5 and 6 may be made as follows. The magnetic layers (pinned and switching) of the DOMR head may be fabricated of any suitable magnetic material such as cobalt (Co), iron (Fe), nickel (Ni) and their alloys such as nickel-iron (NiFe), and iron-cobalt (FeCo), for example. The nonmagnetic spacer layer or layers of the DOMR head may be formed as very thin film depositions of copper (Cu), or suitable noble metals such as silver (Ag) or gold (Au) or their alloys. The exchange biasing layer or layers of the DOMR head may comprise an antiferromagnetic material such as iron-manganese (FeMn) or nickel-manganese (NiMn), for example. Finally, a capping layer (not shown) of the DOMR head may be made of a material having a relatively higher resistivity than the magnetic layers 28 and 32, such as tantalum (Ta) or zirconium (Zr), and the capping layer may be deposited over the top layer of the layered structure of the DOMR head.

In FIG. 7, a playback method utilizing the DOMR head is illustrated. Write current, magnetization level of the medium, conventional head output, and the digital head output are plotted vs. time for an arbitrary data sequence. As can be seen from FIG. 7 the output of the DOMR head closely tracks that of the write current used to record the data sequence. The DOMR head recovers NRZ data naturally. This can simplify somewhat the decoding circuitry, since the data does not have to be converted from NRZI to NRZ to recover the input data as generally is the case with a conventional MR or inductive head. Because the DOMR head provides a substantially digital output, demodulation schemes, i.e., peak detection can be simplified. When the DOMR head is used in conjunction with DC free codes, as are well known in the art, demodulation may be achieved simply by sampling the output signal to determine whether it is above or below a DC level. In this case, if the DOMR head output is above the DC level, the data bit is an NRZ "1"; and, if the output is below DC level, the bit is an NRZ "0". Without DC free codes the DC level may vary, depending upon the data being read by the DOMR head from the relatively moving medium.

Figure 8:
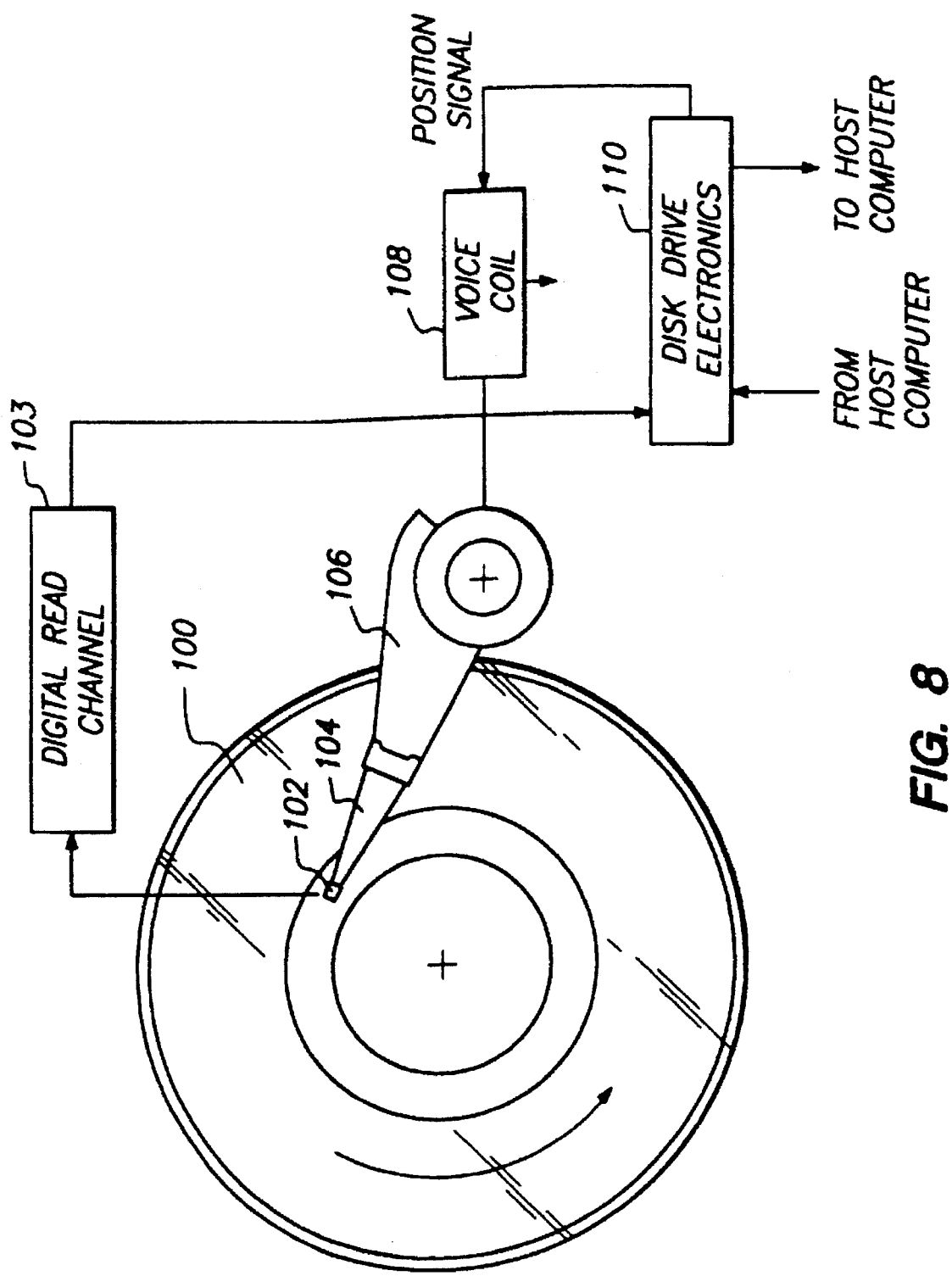
FIG. 8 illustrates a DOMR head being used in a disk drive.

In FIG. 8, an example of the use of a DOMR head in a disk drive apparatus is illustrated. The disk drive has at least one data storage disk 100 rotating at a predetermined angular velocity in the direction of the arcuate arrow and comprising magnetic transitions stored on e.g. a multiplicity of concentric recording tracks. The disk 100 is supported in position by a spindle which includes, or is attached to, a spin motor, not shown, which receives control signals from the disk drive electronics 110. Slider 102 is positioned over the magnetic recording disk 100, and supports one or more magnetic transducers including a DOMR head, also not shown. The slider 102 is attached to suspension 104 which in turn is connected to an actuator arm 106. A mechanical mover, such as a voice coil actuator 108 controls the positioning of actuator arm 106. Based on the position signals received from the disk drive electronics 110, the voice coil actuator 108 moves the actuator arm 106 and hence the slider 102 containing the DOMR head radially in and out over the disk's 100 surface, allowing the DOMR head to be positioned over the magnetic information to be read.

As the disk 100 rotates during operation, an air bearing is created between the disk's 100 surface and the slider 102 such that the slider 102 and hence the DOMR head "flies" over the surface of the disk 100 as it is rotated. It should be noted that the DOMR head could also be used in a contact head application such as a "floppy" disk drive and/or a magnetic tape drive.

It will be recalled that one of the principal advantages of a DOMR head is that read channel electronics 103 may be simplified in that simplified serial data detection schemes may be used, since the DOMR head recovers non-return-to zero ("NRZ") data digitally. Accordingly, a serial data stream of digital electrical signal transitions as read by the DOMR head element of the slider 102 is conditioned and processed within the digital read channel 103 which "recovers" the data stream in relation to a read data clocking signal. The serial data stream, most preferably in a coded format, is then passed on to the data handling sections of the disk drive electronics, for decoding and framing into user data blocks preparatory to delivery of the user data blocks to the host computing system in conventional fashion. In this particular example, the head slider 102 also most preferably comprises an inductive write element for writing data to selected data locations of the concentric storage tracks. A disk drive employing conventional thin film read/write heads which is readily adapted and improved by inclusion of the DOMR head of the present invention is described in commonly assigned U.S. Pat. No. 5,255,136 entitled: "High Capacity Submicro-Winchester Fixed Disk Drive", the disclosure thereof being incorporated herein by reference.

Figure 9:
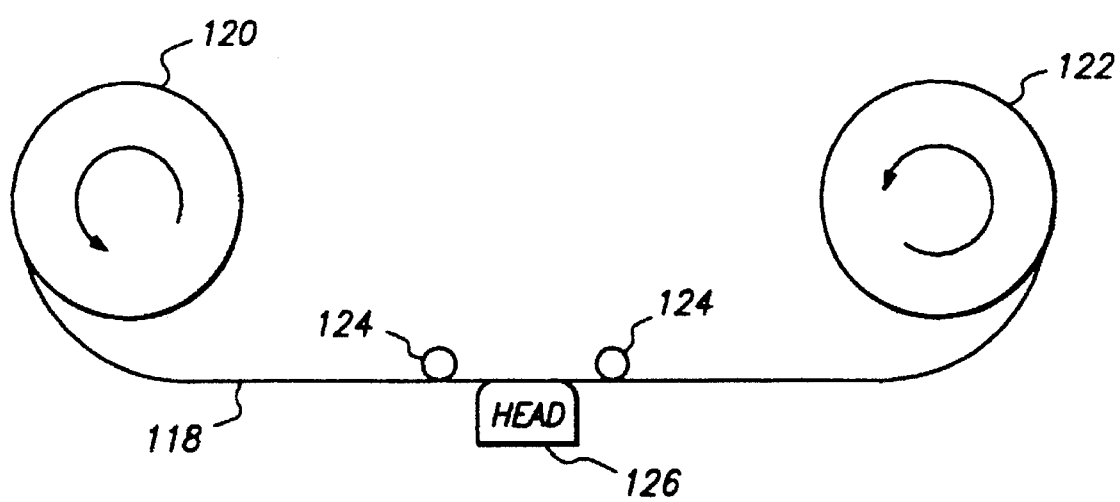
FIG. 9 illustrates a DOMR head being used in a tape drive.

FIG. 9 illustrates the use of a DOMR head in a tape drive storage system. Magnetic recording tape 118 is stored on storage reel 120. The tape 118 is passed over DOMR head structure 126 and wound onto take-up reel 122 in any conventional manner. Wheels 124 position the tape against the head structure 126 such that the tape is in contact with the head 126. The DOMR head structure 126 may comprise multiple DOMR heads; can be engaged by any conventional means; and, may comprise a contact helical tape head, for example.

While the term "layer" is used herein to describe the switched layer, the nonmagnetic layer, and the pinned layer, those skilled in the art will appreciate and understand that a particular layer may be formed as a series of depositions of suitable materials, and that such series may have a variety of planar shapes and thicknesses.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A mass storage device comprising:

a magnetic recording medium comprising magnetic transitions stored thereon;

a magnetoresistive head supported in close proximity to said recording media comprising a layered structure deposited on a substrate, said layered structure comprising a pinned layer of magnetic material and a digital switching layer of magnetic material separated by a layer of nonmagnetic material, said pinned layer having a substantially fixed magnetization direction, said digital switching layer comprising first and second magnetization directions, said first magnetization direction being substantially parallel to said magnetization direction of said pinned layer after said head passes a first magnetic transition defined on the recording media, and said second magnetization direction being substantially antiparallel to said magnetization direction of said pinned layer after said head passes a subsequent magnetic transition defined on the recording media and manifesting a magnetic field polarity opposite in direction to that of said first magnetic transition; and digital read channel electronics having an input connected to the head for receiving and processing a serial data stream put out by the head during relative movement between the magnetic recording medium and the head.

2. The mass storage device of claim 1 wherein an output from the head from its movement relative to said magnetic recording medium is a function of the strength and direction of said magnetic flux from said magnetic domains being read and comprises a substantially digital waveform.

3. The mass storage device of claim 2 wherein said substantially digital waveform put out by the head follows a non-return-to-zero format.

4. The mass storage device of claim 1 wherein a mechanism for switching magnetization direction of said digital switching layer comprises shape anisotropy and wherein said digital switching layer comprises a rectangular shape having a length dimension substantially perpendicular to the medium which is approximately twice a width dimension thereof.

5. The mass storage device of claim 1 wherein a mechanism for switching magnetization direction of said digital switching layer comprises crystalline anisotropy and wherein said digital switching layer of said head comprises an easy axis formed using crystalline anisotropy.

6. The mass storage device of claim 1 wherein said mass storage device is a disk drive and said magnetic recording medium is a rotating magnetic data storage disk.

7. The mass storage device of claim 1 wherein the head includes a pinning layer formed adjacent to the pinned layer on the other side of the nonmagnetic layer, for fixing the direction of magnetization of said pinned layer.

8. The mass storage device of claim 1 wherein the layer of nonmagnetic material comprises a thin film not substantially greater than several atomic thicknesses of a material selected from the group consisting of copper, silver, gold, and alloys including copper, silver or gold.

* * * * *